US008905681B2

(12) United States Patent
Schneider et al.

(10) Patent No.: US 8,905,681 B2
(45) Date of Patent: Dec. 9, 2014

(54) PNEUMATIC CONVEYING PROCESS FOR PARTICULATE MATERIALS

(75) Inventors: Heinz Schneider, Lancaster, PA (US); Paul Wagner, Lancaster, PA (US)

(73) Assignee: Pelletron Corporation, Lancaster, PA (US)

( * ) Notice: Subject to any disclaimer, the term of this patent is extended or adjusted under 35 U.S.C. 154(b) by 679 days.

(21) Appl. No.: 13/189,527

(22) Filed: Jul. 24, 2011

(65) Prior Publication Data

US 2012/0020747 A1    Jan. 26, 2012

Related U.S. Application Data

(60) Provisional application No. 61/367,768, filed on Jul. 26, 2010.

(51) Int. Cl.
*B65G 53/36* (2006.01)
*B65G 53/06* (2006.01)
*B65G 53/60* (2006.01)

(52) U.S. Cl.
CPC ............... *B65G 53/06* (2013.01); *B65G 53/36* (2013.01); *B65G 53/60* (2013.01)
USPC ............... 406/156; 406/1; 406/121; 406/127; 406/144; 406/173; 414/291; 209/139.1; 222/145.2

(58) Field of Classification Search
USPC ..................... 406/1, 121, 127, 144, 156, 173; 414/291; 222/145.1, 145.2; 209/139.1
See application file for complete search history.

(56) References Cited

U.S. PATENT DOCUMENTS 1,509,909 A   9/1924  Stebbins
2,815,858 A   12/1957 Rich
4,220,174 A * 9/1980  Spitz ............................. 137/271
4,341,530 A * 7/1982  Loth et al. ......................... 48/73
4,787,783 A * 11/1988 Girardelli ..................... 406/106
5,035,331 A   7/1991  Paulson ............................ 209/3

(Continued)

FOREIGN PATENT DOCUMENTS

DE   969075    4/1958
DE   1917152   10/1970

(Continued)

OTHER PUBLICATIONS

Waeschle, Elutriator OKRG product brochure, Feb. 1999, Germany.

(Continued)

*Primary Examiner* — Joseph Dillon, Jr.
(74) *Attorney, Agent, or Firm* — Miller Law Group, PLLC

(57) ABSTRACT

A pneumatic conveying process transports plastic pellets from a manufacturing source to a bulk silo for storage before being delivered to the ultimate production utilization of the plastic pellets. Multiple types or multiple sources of plastic pellets can be fed through a common pneumatic conveying conduit to respective bulk silos for temporary storage with diverter valves being utilized to direct product into and out of the common conveying conduit. Expanded elbow fittings are deployed at each directional change in the conveying lines to eliminate the creation of streamers at conduit bends. The plastic pellets are conveyed at a medium velocity between dense and dilute phases to provide a gentle conveying operation. A closed loop air supply system is used for dedusting devices providing a final removal of dust and debris from the stored product before being delivered to the ultimate utilization facility.

5 Claims, 7 Drawing Sheets

(56) References Cited

U.S. PATENT DOCUMENTS

| | | | |
|---|---|---|---|
| 5,147,152 A * | 9/1992 | Link | 406/1 |
| 5,622,457 A * | 4/1997 | Thiele | 406/1 |
| 6,527,141 B2 * | 3/2003 | Sanders | 222/1 |
| 6,595,369 B2 | 7/2003 | Paulson | 209/149 |
| 6,659,693 B1 * | 12/2003 | Perkins et al. | 406/62 |
| 6,951,354 B1 | 10/2005 | Paulson | 285/179 |
| 7,080,960 B2 * | 7/2006 | Burnett | 406/11 |
| 7,300,074 B1 | 11/2007 | Paulson | |
| 8,251,096 B2 * | 8/2012 | Schiel et al. | 137/625.68 |
| 8,360,691 B2 * | 1/2013 | Moretto | 406/17 |
| 2007/0272598 A1 * | 11/2007 | Schneider et al. | 209/12.1 |
| 2010/0028090 A1 * | 2/2010 | Mauchle et al. | 406/121 |
| 2010/0236583 A1 * | 9/2010 | Schneider et al. | 134/34 |
| 2010/0237267 A1 * | 9/2010 | Chuang et al. | 251/304 |
| 2013/0068263 A1 * | 3/2013 | Schneider et al. | 134/32 |
| 2013/0074282 A1 * | 3/2013 | Schneider et al. | 15/353 |
| 2013/0220893 A1 * | 8/2013 | Sukkar | 209/147 |
| 2013/0309052 A1 * | 11/2013 | Luharuka et al. | 414/291 |

FOREIGN PATENT DOCUMENTS

| | | | | |
|---|---|---|---|---|
| DE | 3716585 | | 12/1987 | |
| DE | 9302508 | U1 | 7/1993 | |
| DE | 9302508 | | 8/1993 | |
| EP | 2412652 | A1 * | 1/2012 | B65G 53/06 |
| GB | 1432722 | A | 4/1976 | |
| JP | 2004262641 | A | 9/2004 | |

OTHER PUBLICATIONS

Coperion, Plastics Manufacturers, product brochure, Sep. 2004.
Pelletron Corporation, Kinetic Gravity DeDuster, product brochure, Jan. 2004, United States.
Messe Dusseldorf, press publication of Feb. 26, 2009, Germany.
Coperion, Gravity Rotation Separator, product brochure, May 2002, Germany.
Waeschle, Diverting Counterflow Elutriator UGS, product brochure, Jan. 1999, Germany.
Waeschle, "Die Richtigen Komponenten für Ihre Schuttgutaufbereitung", product brochure, Jan. 1997, Germany.

* cited by examiner

PNEUMATIC CONVEYING PROCESS FOR PARTICULATE MATERIALS

CROSS-REFERENCE TO RELATED APPLICATIONS

This application claims domestic priority on U.S. Provisional Patent Application Ser. No. 61/367,768, filed on Jul. 26, 2010, the content thereof being incorporated herein by reference.

FIELD OF THE INVENTION

The invention disclosed in this application is directed generally to a process for conveying particulate materials, such as plastic pellets and other granular bulk solids with similar product properties, and particularly to the a pneumatic conveying process, consisting of a combination of technologies, that provides a high quality particulate material for the end user of the particulate material with a minimum of dust, streamer and other imperfection-causing debris within the particulate material.

BACKGROUND OF THE INVENTION

It is well known, particularly in the field of transporting and using particulate materials, commonly powders, granules, pellets, and the like that it is important to keep product particles as free as possible of contaminants. Particulates are usually transported within a facility where they are to be mixed, packaged or used in a pressurized tubular system that typically produces a stream of material that behaves somewhat like a fluid and, thus, can be conveyed pneumatically through pipes. As these materials move through the pipes, considerable friction is generated not only between the particles themselves (referred to as internal friction), but also between the tube walls and the particles in the stream (referred to as wall friction).

In high velocity dilute phase systems in which the velocity is in the range of 25-40 meters/second, this friction results in the development of particle dust, broken particles, fluff, streamers (ribbon-like elements that can "grow" to become comparatively long and tangled), and glass fibers in glass filled products, that can impede the flow of materials or even totally block the flow of material through the pipe. The characteristics of such a transport system are quite well known, as is the importance and value of keeping product particles as free as possible of contaminants. In slow motion dense phase systems, the velocity is low (in the range of 2-10 meters/second), but the pressure is high (in the range of 0.5 to 3.5 bar). This results in high wall friction and friction between the pellets compressed in plugs moving through the pipe. This high friction creates very fine, high electrostatic-charged dust within the product being conveyed.

The term "contaminant" as used herein includes a broad range of foreign material and includes foreign debris as well as broken particles or streamers formed from the product being transported through the pipe. In either case, using plastics as an example, such foreign debris would have a detrimental effect on the finished product. Specifically, foreign debris, which by definition is different in composition from the primary material, and would include material such as dust, and non-uniform material of the primary product, such as streamers, would not necessarily have the same melting temperatures as the primary product being conveyed and would cause flaws when the plastics material is melted and molded. These flaws result in finished products that are not uniform in color, may contain bubbles, and often appear to be blemished or stained, and are, therefore, unsalable.

It is important also to note that since these same non-uniform materials often do not melt at the same temperature as the primary product, the unmelted contaminants cause friction and premature wear to the molding machines, resulting in downtime, lost production, reduced productivity, increased maintenance and thus increased overall production costs. Streamers can create problems throughout the conveying system, and in the manufacturing processes, but can also reduce or clog the discharge system to the scale, which results in errors in the weighing process. Long streamers and fine micro dust are very difficult to remove from the product. A conveying system with medium velocity (in the range of 15 to 25 meters per second) and medium pressure (in the range of 0.5 to 2.0 bar) would not have a tendency to create long streamers and fine micro dust or the other extreme contaminates created by the dilute and dense phases of conveying particulate material.

Dust, streamers and other contaminants are generated mostly by the transport system. Accordingly, it is of primary importance to not only provide apparatus that provides for a thorough cleaning the particulate material being conveyed, but to do so as close to the point of use of the particulate material as possible so as to avoid the generation of contaminants through additional transport. For these reasons, compact dedusting devices have been used for many years to clean materials in such applications. The compact dedusting devices are capable of handling smaller volumes of product, yet also capable of thoroughly cleaning the product. The compact dedusting devices permit the installation of the dedusting device immediately before final use of the products, rather than at an earlier stage after which re-contamination can occur within the conveying system.

Dedusting devices used to clean contaminants from particulate material can be found in U.S. Pat. No. 5,035,331, granted to Jerome I. Paulson on Jul. 30, 1991, in which air is blown upwardly through wash decks over which a flow of contaminated particulate material is passed so that the flow of air up through the wash decks removes the contaminants from the material flow. A magnetic field is provided by the dedusting device so that the particulate material flow passes through the magnetic field to neutralize the static charge on the particulates and facilitate the removal of the contaminants from the material. The flow of contaminant laden air is discharged from the dedusting device, while the cleaned particulate material is passed on to the manufacturing process.

A compact dedusting apparatus is disclosed in U.S. Pat. No. 6,595,369, granted on Jul. 22, 2003, to Jerome I. Paulson. Like the larger dedusting apparatus depicted in U.S. Pat. No. 5,035,331, the flow of particulate material through the dedusting apparatus is cleansed of contaminates that have had the static charged attracting the contaminates to the particulates neutralized by a magnetic flux field. The cleaning process also utilizes a flow of air passing through the stream of particulate material passing over wash decks. The contaminate-laden air is discharged through the top of the dedusting apparatus, while the cleaned particulate material is discharged from the bottom of the dedusting device.

Conventional pneumatic conveying systems would provide conveying of particulate material in either a dense phase or in a dilute phase. In the dense phase, the particulate material moves through the pipe rather slowly in a packed, though fluidized, state. Dense phase systems move more product per pound of air, but travel at lower velocities and at higher pressures. Typically, system operating pressures will not exceed 3.5 bar (50 psig). Dilute phase conveying systems, however, utilize a high velocity stream of air contained within the pipe. Dilute phase velocities often exceed 35-40 meters per second (5000-8000 feet per minute) and use up to one pound of air to move as much as five pounds of product through the pipe. Typical air pressures for dilute phase systems will be approximately 0.8 bar (about 12 psig). High air velocity and low product particle population is accomplished with low pressure resistance, but greatly increased damage to the product particles being conveyed. Damage occurs in straight pipe sections, but is greatly increased whenever directional changes are imposed on the conveying system.

Turn-down ratios in terms of pneumatic conveying of particulate material can be defined as the reduction of the rate of flow of product through the conveying pipes as compared to the designed flow rate. For example, if a pneumatic conveying system is designed to convey 100 tons of particulate product per hour, and the operator desires to reduce the rate to 50 tons per hour, adjustments have to be made in the parameters for conveying the product. The dilute and dense phases of conveying have little flexibility in turn-down rations. Reducing the flow rate in a dense phase conveying system will likely result in plugging the conveying pipes with particulate material. Simply reducing the ration of product to air in a dilute phase conveying system can result in substantial damage to the product being conveyed. An intermediate conveying phase, referred to as a Strandphase® conveying, having velocities and pressures between the dilute and dense conveying phases, is more flexible in adapting to turn-down ratios.

In pneumatic conveying systems, whether the conveying system is operating under dilute phase or dense phase, the product particles suffer considerable damage during transport, particularly when changes in direction are being used. Therefore, when changes in direction of the pipe through which the particulate material are being conveyed are required, elbow fittings are utilized. Elbow fittings for pneumatic conveying systems, in order to effect changes in direction, will often have a radius as much as ten times the diameter of the pipe being utilized. Even with such elbow fittings, the combination of high velocity and centrifugal force does most of the damage to the particulate material, particularly with respect to heat sensitive plastic compounds.

Elbow fittings used in pneumatic conveying systems typically suffer wear at the elbow curve in line with the product flow into the elbow fitting, whether the elbow fitting is a short radius elbow or a long radius sweep elbow fitting. Particles flowing into the elbow fitting impact the curved surface of the elbow and are redirected. The bouncing product particles create an area of turbulence that slows the speed of conveyance of the particles through the system. Furthermore, the bouncing particles and the movement of the product particles around the outer surface of the elbow fitting generate friction, making the surface of the fitting warm to the touch. This heat can have a detrimental effect on the product being conveyed, particularly when the product is heat sensitive, such as plastic pellets on which the edges of the pellets will melt and adhere to the pipe.

A solution to providing an elbow fitting with minimal wear characteristics can be found in U.S. Pat. No. 6,951,354, granted on Oct. 4, 2005, to Jerome I. Paulson, and in U.S. Pat. No. 7,300,074, granted on Nov. 27, 2007, to Jerome I. Paulson, both of which have been assigned to Pelletron Corporation. In these two patents, an elbow fitting expands from the inlet pipe along the outer side of the elbow fitting to define a generally triangularly shaped configuration that retains a layer of slowly moving particles being conveyed within the pneumatic conveying system along the outside surface of the fitting to deflect incoming product flow. In U.S. Pat. No. 7,300,074, a step feature was added to the outer surface structure of the elbow fitting to create a Bernoulli Effect causing the accumulated product particles to enter the air flow after the incoming flow of product particles has ceased.

Accordingly, it would be desirable to provide a new process for pneumatically conveying particulate material through pipes with medium velocities and medium pressure. Such a process would minimize damage to the particulate material while cleaning dust and debris from the particulate material to provide a high quality product to the end user. It would also be desirable to provide an improved process for conveying particulate materials used in the plastics industry.

SUMMARY OF THE INVENTION

It is an object of the invention to overcome the disadvantages of the prior art by providing a process for the gentle pneumatic conveying of plastic pellets and other similar bulk material particulates.

It is another object of this invention to provide an effective conveying process for multiple types of plastic pellets from product bins to bulk silos for distribution to a production facility utilizing a common pipe.

It is a feature of this invention that expanded elbow fittings are provided at each of the pipe bends to reduce damage to the plastic pellets due to directional changes in the conveying pipe.

It is another feature of this invention that rotary valves configured to minimize damage to plastic pellets being fed into a pneumatic conveying pipe are utilized at each junction between product bins and a corresponding pneumatic conveying line.

It is an advantage of this invention that the components used in pneumatically conveying plastic pellets from one point, such as a product bin, to a second point, such as a bulk silo, minimize the creation of streamers and dust particles during the conveying process.

It is still another feature of this invention that the plastic pellets are conveyed at a velocity that creates a conveying phase between dense and dilute phases.

It is another advantage of this invention that the medium velocity at which the product is conveyed within the pipe is in the range of 15 to 25 meters per second.

It is still another advantage of this invention to avoid the extreme contaminates created in the dilute phase and in the dense phase of pneumatic conveying systems.

It is yet another feature of this invention that diverter valves are utilized along the common conveying pipe to direct specific product into the common conveying pipe and to direct the specific product out of the common conveying pipe into a corresponding bulk silo.

It is still another object of this invention to deploy a dedusting apparatus between the bulk silo and the final production facility to remove the dust and debris from the stored product immediately before being delivered to the final production facility.

It is yet another advantage of this invention that the dust and debris collected from the stored plastic pellets by the dedusting apparatus is removed from the air supply system by a dust collection device for convenient disposition thereof.

It is a further object of this invention to provide a gentle conveying process for plastic pellets that is durable in construction, inexpensive of manufacture, carefree of maintenance, facile in assemblage, simple and effective in use, and flexible to operate in reference to turn-down ratios.

These and other objects, features and advantages are accomplished according to the instant invention by providing a pneumatic conveying process that transports plastic pellets from a manufacturing source to a bulk silo for storage before being delivered to the ultimate production utilization of the plastic pellets. Multiple types or multiple sources of plastic pellets can be fed through a common pneumatic conveying pipe to respective bulk silos for temporary storage with diverter valves being utilized to direct product into and out of the common conveying pipe. Expanded elbow fittings are deployed at each directional change in the conveying lines to eliminate the creation of streamers at pipe bends. The plastic pellets are conveyed at a medium velocity between dense and dilute phases to provide a gentle conveying operation. A closed loop air supply system is used for dedusting devices providing a final removal of dust and debris from the stored product before being delivered to the ultimate utilization facility.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
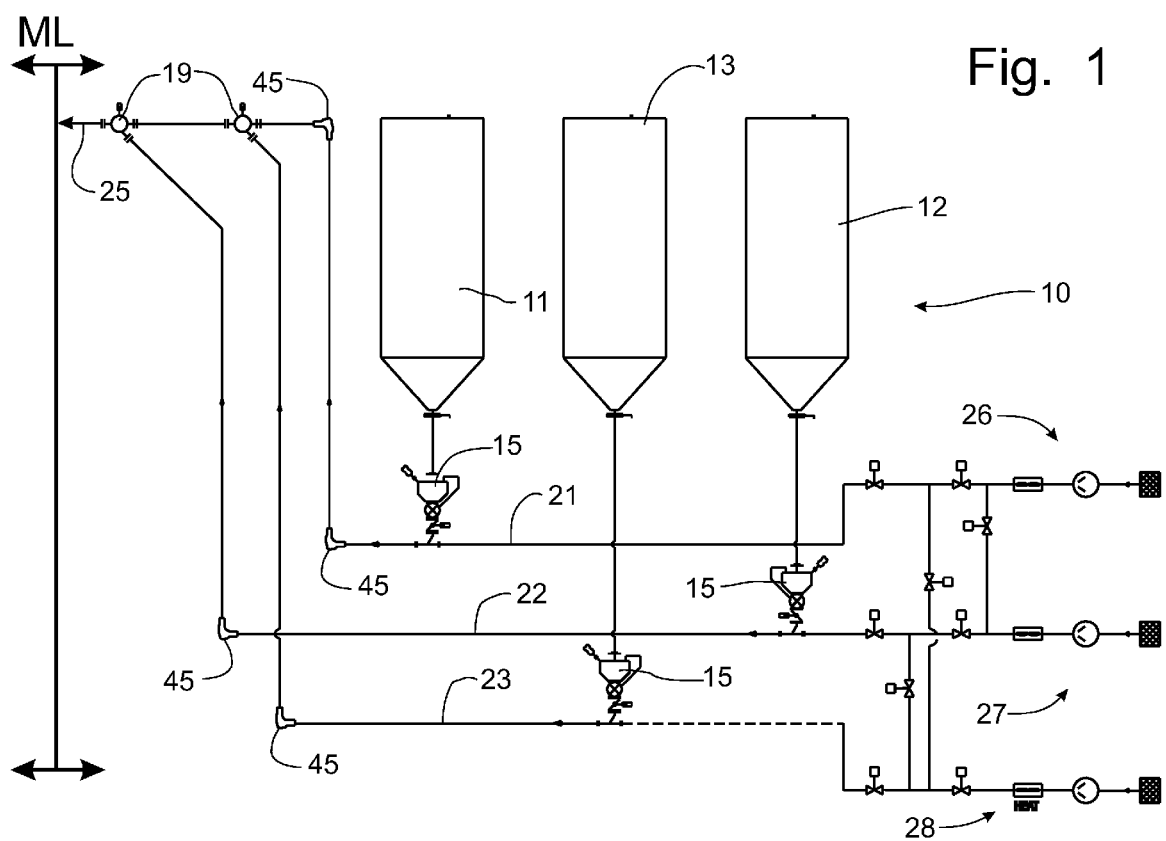
FIG. 1 is a first portion of a flow diagram depicting the operation of a gentle pneumatic conveying system operable to transfer multiple sources of plastic pellet product through a common conveying pipe for delivery to bulk silos for temporary storage thereof, this first portion of the flow diagram is to be combined with the second portion of the flow diagram depicted in FIG. 2 along the match line.

The expanded elbow fitting, rotary valve and dedusting apparatus are known in the art. A description of the structure and operation of an expanded elbow fitting can be found at U.S. Pat. No. 6,951,354, granted on Oct. 4, 2005, to Jerome I. Paulson, specifically as shown in FIGS. 1-4 and described at column 4, line 63, through column 7, line 54, and in U.S. Pat. No. 7,300,074, granted on Nov. 27, 2007, to Jerome I. Paulson, specifically as shown in FIGS. 1-5 and described at column 5, line 25, through column 6, line 54, both of which have been assigned to Pelletron Corporation. A description of the rotary valve configured to enhance conveying efficiencies and minimize air losses from the pneumatic conveying system can be found in U.S. patent application Ser. No. 12/717, 152, filed on Mar. 4, 2010, specifically as shown in FIGS. 2-7 and described at Paragraphs [0033] through [0037]. A description of the structure and operation of a dedusting apparatus and a compact dedusting apparatus can be found in U.S. Pat. No. 5,035,331, specifically as shown in FIGS. 2-5 and described at column 2, line 47 through column 4, line 31, and in U.S. Pat. No. 6,595,369, specifically as shown in FIGS. 11 and 12 and described at column 6, lines 30-47, both of which were issued to Jerome I. Paulson. A description of a cylindrical dedusting apparatus can be found in U.S. Pat. No. 8,312, 994, granted on Nov. 20, 2012, to Heinz Schneider, specifically as shown in FIGS. 1-12 and described at column 5, line 11, through column 8, line 37. The contents of each of these patents and patent applications are hereby incorporated herein by reference. The combination of these technologies with the intermediate Strandphase® conveying presents a unique operating system for pneumatic conveying systems that is particularly adaptable for use in conveying plastic pellets from a supply source to a packaging source, as will be described in greater detail below.

Typical particulate material to be conveyed by the system 10 is plastic pellets that are to be passed into an injection molding machine to form plastic components. Examples of plastic particulate material that can be conveyed by the system 10 are polyester, acrylic, high density polyethylene, polypropylene, nylon, polycarbonates, styrene, and low density polyethylene. Generally, plastic pellets will have dust and streamers adhered thereto. Either the dust or the streamers or both could be of the same material as the plastic particulate product or the dust and/or streamers could be completely dissimilar contaminants. Often the dust and streamers are created during the conveying process from the production source of the plastic pellets due to either directional changes in the conveying pipe or the conveying phase utilized to pneumatically convey the product through the pipes. Another source of dust and debris is the pellet production process itself. Accordingly, some dust and debris will likely be within the product before being conveyed.

Figure 2:
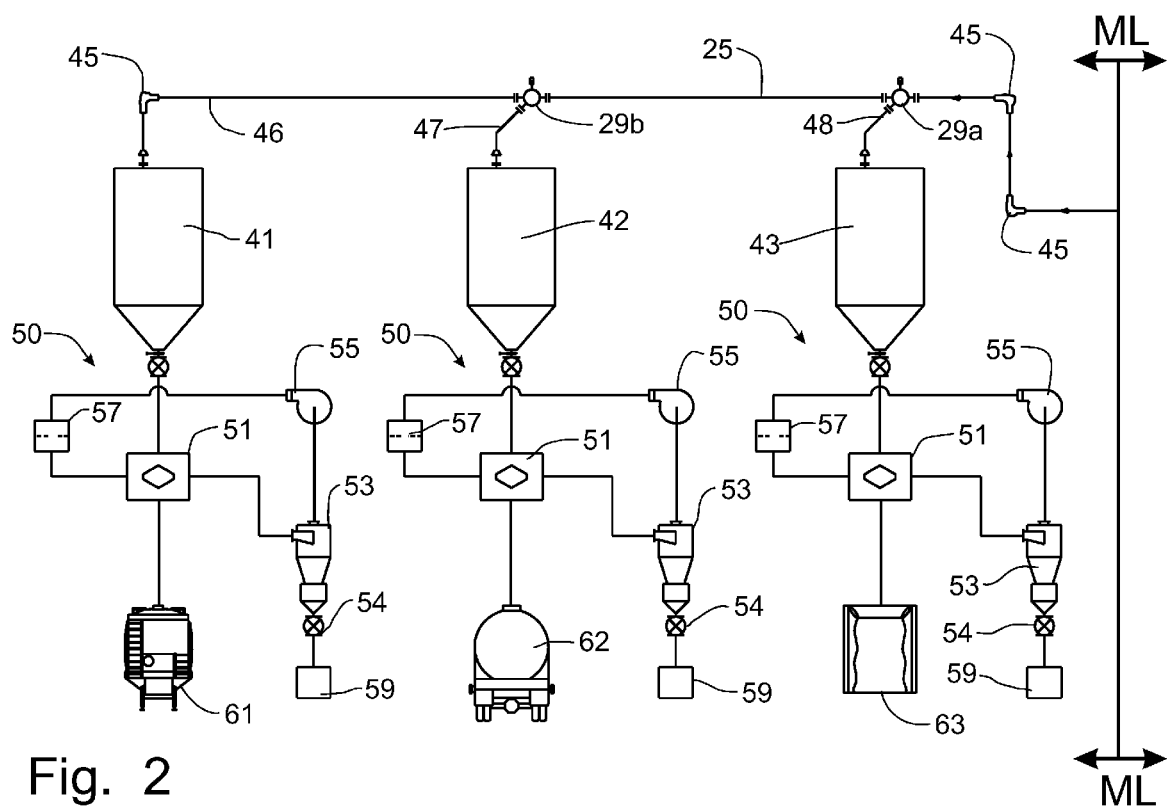
FIG. 2 is a second portion of a flow diagram depicting the operation of a gentle pneumatic conveying system operable to transfer multiple sources of plastic pellet product through a common conveying pipe for delivery to bulk silos for temporary storage thereof, this second portion of the flow diagram is to be combined with the first portion of the flow diagram depicted in FIG. 1 along the match line.

A representative arrangement of a production facility 10 for plastic pellets from a storage facility 11-13 to a packaging facility 41-43 can be seen in FIGS. 1 and 2. One skilled in the art will recognize that many different combinations of conveying pipes 21-23, 25 and 46-48 can be utilized in such a production facility 10. For example, the number of storage bins 11-13 can be determined by the number of different grades of a single kind of plastic pellet, or by multiple types of plastic pellets. Further, the bulk silos 41-43 can be arranged in different configurations, although current packaging of plastic pellets conventionally falls into being transported in bags, rail cars or trucks. For example, each bulk silo 41-43 shown in FIG. 2 may have associated therewith a dedusting system 50, or the discharge of all of the bulk silos 41-43 can be combined into a single discharge pipe (not shown) that is associated with a dedusting system 50 before being placed into a transport medium 61-63.

Different grades of plastic pellets, or different types of plastic pellets from a single production source are represented by the product bins 11, 12 and 13. Each product source 11-13 is associated with an individual feeder line 21, 22 and 23, respectively. Each respective individual feeder line 21-23 is provided with a conventional source of compressed air, generally identified with the reference numbers 26, 27 and 28. Product is dropped from the product supply bins 11-13 to the respective feeder line 21-23 through a rotary valve 15 such as is shown and described in the aforementioned U.S. patent application Ser. No. 12/717,152, specifically as shown in FIG. 1 and described at Paragraphs [0031], [0032] and [0035] through [0037], so that the product is metered into the air flow passing through the individual feeder lines 21-23.

Each of the individual feeder lines 21-23 can connect to a common conveyor line 25 by a diverter valve 19a, 19b that is operable to selectively connect the respective individual feeder line 21-23 to the common conveyor line 25. Alternatively, some of the feeder lines 21-23 can proceed directly to a particular bulk silo 41-43 without connecting to the common conveyor line 25. The first diverter valve 19a connects two of the feeder lines 21, 23 to the common conveyor line 25 so that either or neither of the two lines 21, 23 can move product into the common conveyor line 25. In the event the first diverter valve 19a is closed to both feeder lines 21, 23, the second diverter valve 19b can be opened to direct product from the second feeder line 22 into the common conveyor line 25. One skilled in the art will recognize that each of the diverter valves 19 can be remotely operated through electronic controls (not shown).

The common conveyor line 25 connects to a corresponding number of bulk silos 41, 42 and 43 for the independent storage of the different types or sources of plastic pellet product. The bulk silos 41-43 are essentially surge flow controls that allow the plastic pellets to be conveyed from the product storage bins 11-13 continuously even though the discharge from the bulk silos 41-43 into the transportation medium 61-63 is sporadic or interrupted. As with the joinder of the three individual feeder lines 21-23 to the common conveyor line 25, a pair of discharge diverter valves 29a, 29b that selectively direct product moving through the common conveyor line 25 into respective bulk silos 41, 42 and 43 through corresponding individual discharge line 46, 47 and 48. When product from the third product bin 13 in moving into the feeder line 23, the first diverter valve 19a is opened to the third feeder line 23 and closed to the first feeder line 21, while the second diverter valve 19b is closed to the second feeder line 22. This configuration directs product from the third product bin 13 into the common conveyor line 25. Then, an opening of the first discharge diverter 29a directs the product moving through the common conveyor line 25 into the third bulk silo 43 through the discharge line 48. As noted above with respect to the first diverter valves 19, the second diverter valves 29 can also be remotely operated by electronic controls (not shown).

Similarly, a closing of the first diverter valve 19a so that neither of the first or third feeder lines 21, 23 are open to the common conveyor line 25 and an opening of the second diverter valve 19b allows the flow of product from the second feeder line 22 to move into the common conveyor line 25. Then, a closing of the first discharge diverter valve 29a and an opening of the second discharge diverter valve 29b to allow flow into the second discharge line 47 and into the second bulk silo 42. A separate discharge line 46 interconnects the second discharge diverter valve 29b with the first bulk silo 41 so that product can flow through the feeder line 21 into the common conveyor line 25 and into the first bulk silo 41.

Figure 3:
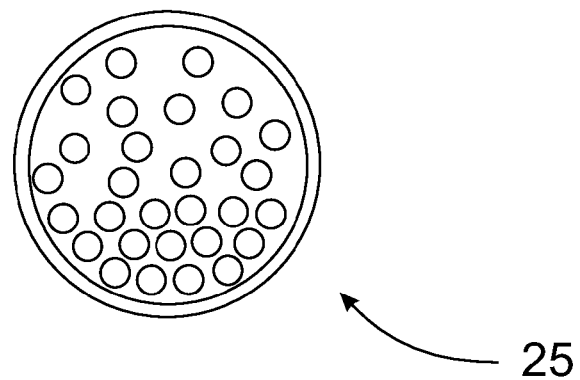
FIG. 3 is a schematic representation of the flow of product particulates through a pipe.
Figure 4:
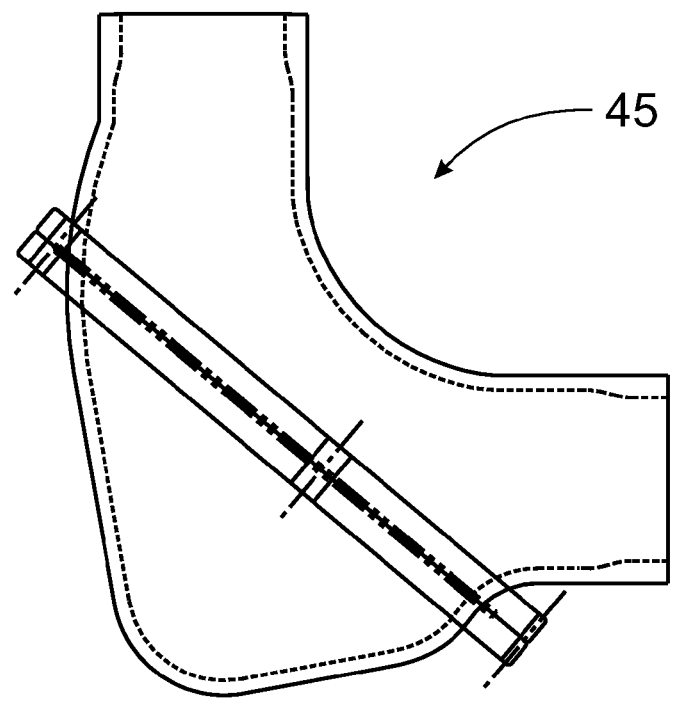
FIG. 4 is a schematic representation of an expanded elbow fitting utilized at bends in the pipe to effect directional changes for the product.

The three compressed air sources 26-28 each deliver into the corresponding individual feeder line a flow of compressed air that will have a flow rate of between 15 meters per second and 25 meters per second. As a result, the product within the pipe is partially dispersed in the gas flow and partially moving at higher concentrations at the bottom of horizontal pipe runs, as is represented in FIG. 3. This conveying phase creates very little micro dust within the conveying process as the individual particles are not densely packed together, as with the dense conveying phase, and the individual particles are not running into each other at high speeds as with the dilute conveying phase.

At each bend of each of the individual feeder lines 21-23, the common conveyor line 25 and the individual discharge lines 46-48, particularly at each right-angle bend of the respective 8 lines, the system 10 is provided with an expanded elbow fitting 45 to ease the flow of the product particulates through the directional change. As is described in greater detail in the aforementioned U.S. Pat. No. 7,300,074, specifically as shown in FIGS. 1-8 and described at column 6, lines 13-33, and at column 6, line 64, through column 7, line 10, the product particulates accumulate along the outer expanded periphery of the elbow fitting 45 to soften the change in direction of the moving particulates. The expanded elbow fitting 45 works particularly well with the conveying phase having a flow rate of 15 to 25 meters per second.

When the product collected within the respective bulk silos 41-43 is discharged into a transportation medium 61-63, the rotary metering valve 49 at the discharge end of the respective bulk silos 41-43 is opened to meter the flow of product into the dedusting system 50 associated with each of the bulk silos 41-43. As is described in U.S. Pat. No. 8,312,994, specifically as shown in FIGS. 1-12 and described at column 5, line 21, through column 6, line 34 and at column 8, line 38, through column 9, line 45, the dedusting apparatus 51 receives the still uncleaned product from the bulk silo 41-43 and disperses the product over sloped wash decks through which air passes to remove the dust and debris from the product particulates. As is described in U.S. Pat. No. 6,595,369, specifically as shown in FIGS. 2-8 and described at column 5, lines 28-57, the static charges inherent with the flow of particulate materials is removed by a magnetic flux at the top of the dedusting apparatus 51 so that the flow of air through the wash decks will be effective to remove event even micro dust from the particulates.

Preferably, a closed circuit (closed loop) dedusting system 50 is utilized so that the air blown through the wash decks is collected from the dedusting apparatus 51 and conveyed to a cyclonic separator 53 which operates to cyclonically separate the dust and debris out of the dirty air to allow cleaned air to be re-circulated by the fan 55 through a filter 57 and back into the dedusting apparatus 51 for further cleaning of dust and debris from the product particulates passing over the sloped wash decks. The dust separated from the uncleaned air at the cyclonic separator 53 is allowed to fall by gravity through a metering valve 54 and into a collection device 59. One skilled in the art will recognize that an open circuit dedusting system 50, in which the air is discharged after cleaning instead of being re-circulated, can also be utilized.

The cleaned product is discharged from the dedusting apparatus 51 and delivered to a subsequent manufacturing machine (not shown) or into a mechanical transportation device, such as a rail car 61, a truck 62 or a collection bag 63, as are representatively depicted in FIG. 2.

A cylindrical dedusting apparatus, as depicted and described in U.S. Pat. No. 8,312,994, specifically as shown in FIGS. 1-9 and described at column 5, line 11, through column 6, line 34, and at column 8, line 37, through column 9, line 45, would be particularly adapted for utilization in the conveying system 10. The cylindrical dedusting apparatus disperses the inflow of product particulates from the bulk silos 41-43 over a conical wash deck through which air is blow upwardly to remove the dust and debris from the particulates. As with the dedusting apparatus 51 described above, the product particulates are subjected to a magnetic flux before being dispersed on the wash deck so that static charges attracting the micro dust to the particulates is eliminated so that even the micro dust can be removed by the air blowing through the wash deck. The dirty air can be collected and cleaned as described above, while the cleaned product particulates are discharged downwardly from the cylindrical dedusting apparatus by gravity.

In operation, the system 10 provides a gentle conveying and cleaning of plastic pellets or other similar bulk materials from a production source to an ultimate user of the particulate material. The conveying phase utilized provides a graduated density of particulates from the bottom of a horizontal pipe to the top, partially dispersed with the upper gas flow and partially moving at higher concentrations along the bottom. This gently operating conveying phase limits the creation of dust and avoids the creation of long streamers. The directional changes are accommodated by expanded elbow fittings 45 that allow product to move through pipe bends without generating heat by friction against the outer shell of the elbow fitting and, thereby, creating product streamers. The dedusting apparatus 51 provides a last second cleaning of what little dust and debris is in the stored product particulates, providing a clean, high quality product for subsequent production efforts.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Figure 5:
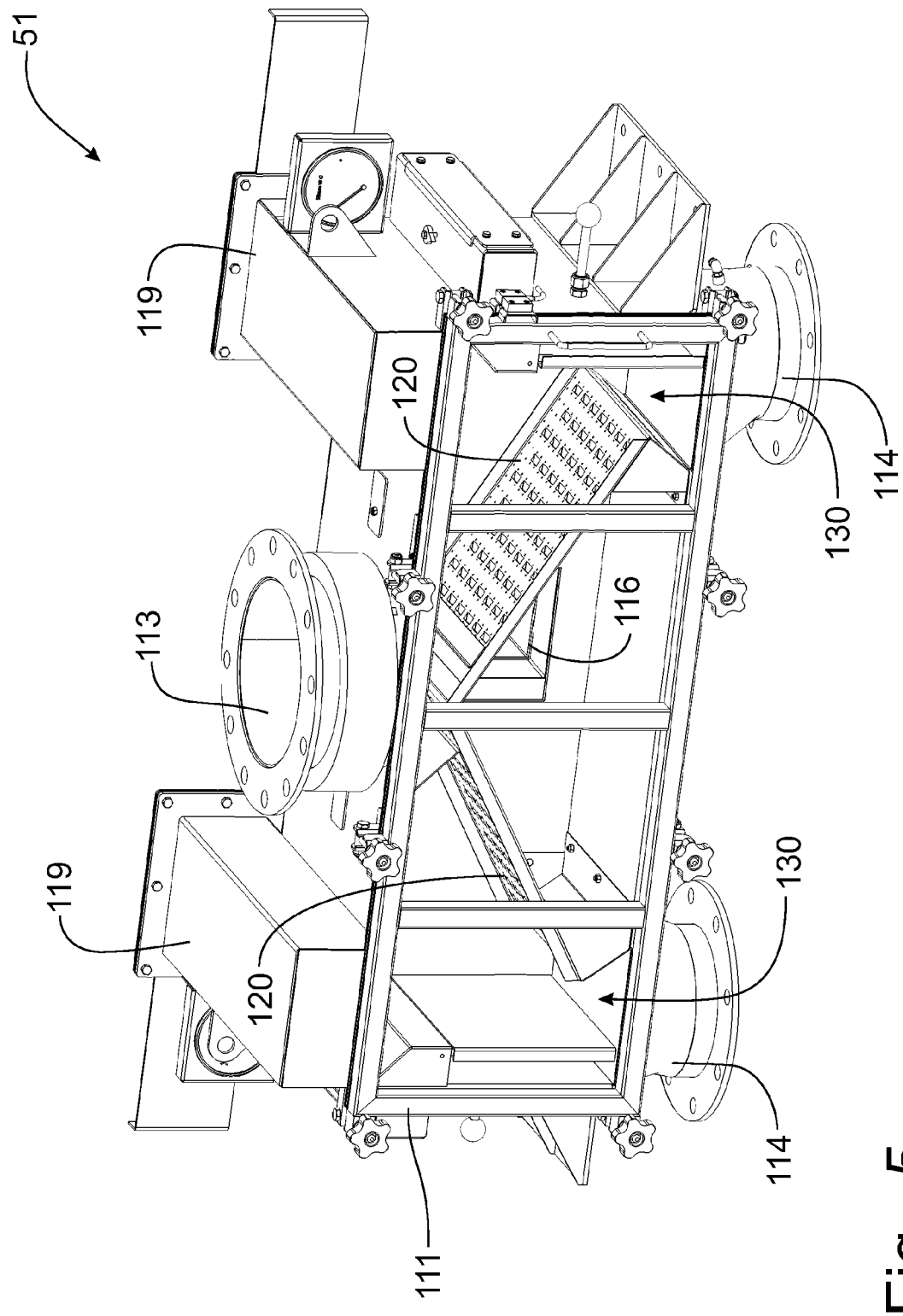
FIG. 5 is a perspective view of a representative dedusting apparatus having a planar wash deck formed with apertures for the passage of a flow of air to remove dirt and debris from a flow of particulate material over the top surface of the wash deck.
Figure 6:
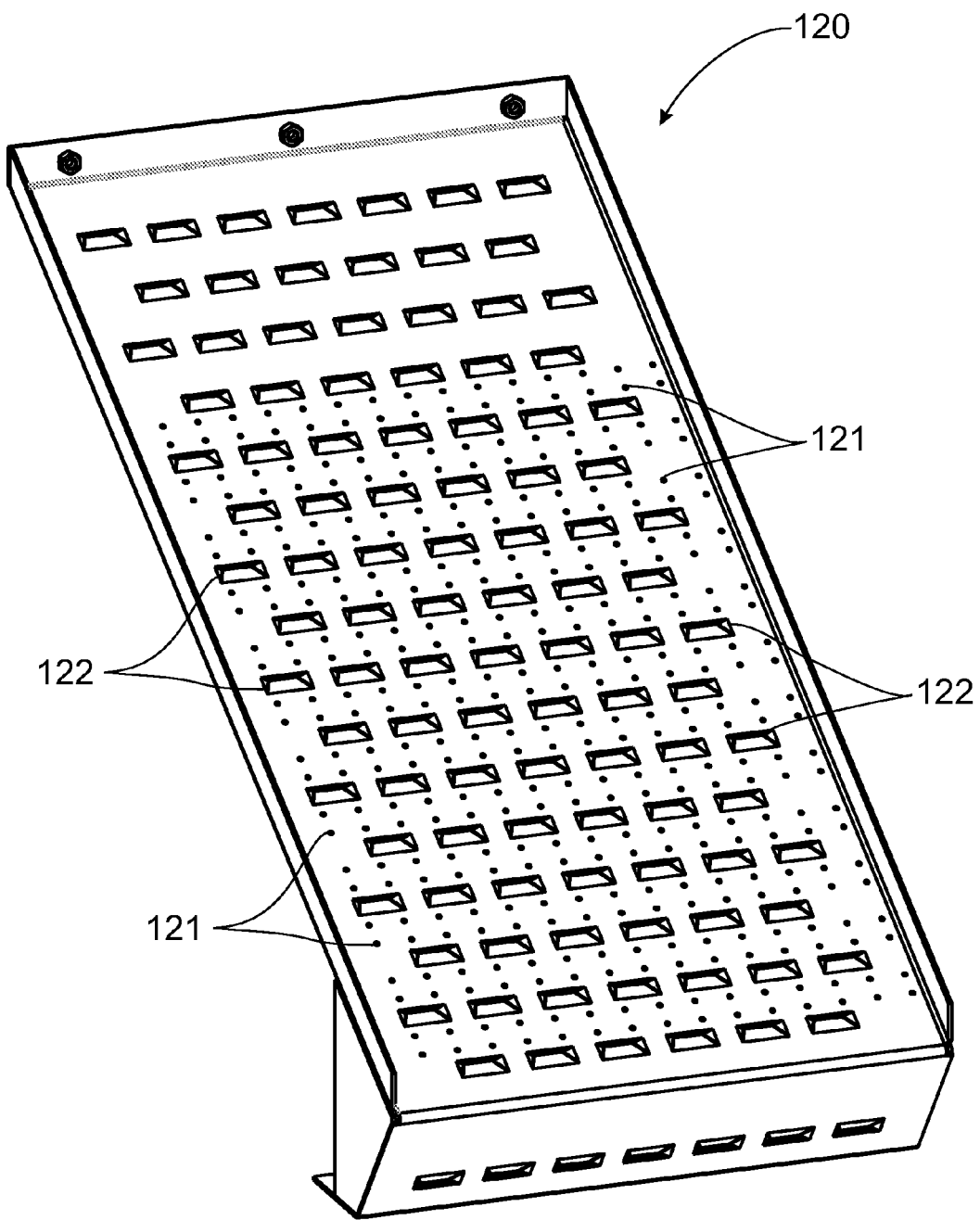
FIG. 6 is an enlarged view of a wash deck as depicted in FIG. 5 and being formed with apertures for the passage of air through the wash deck to clean particulate material.
Figure 7:
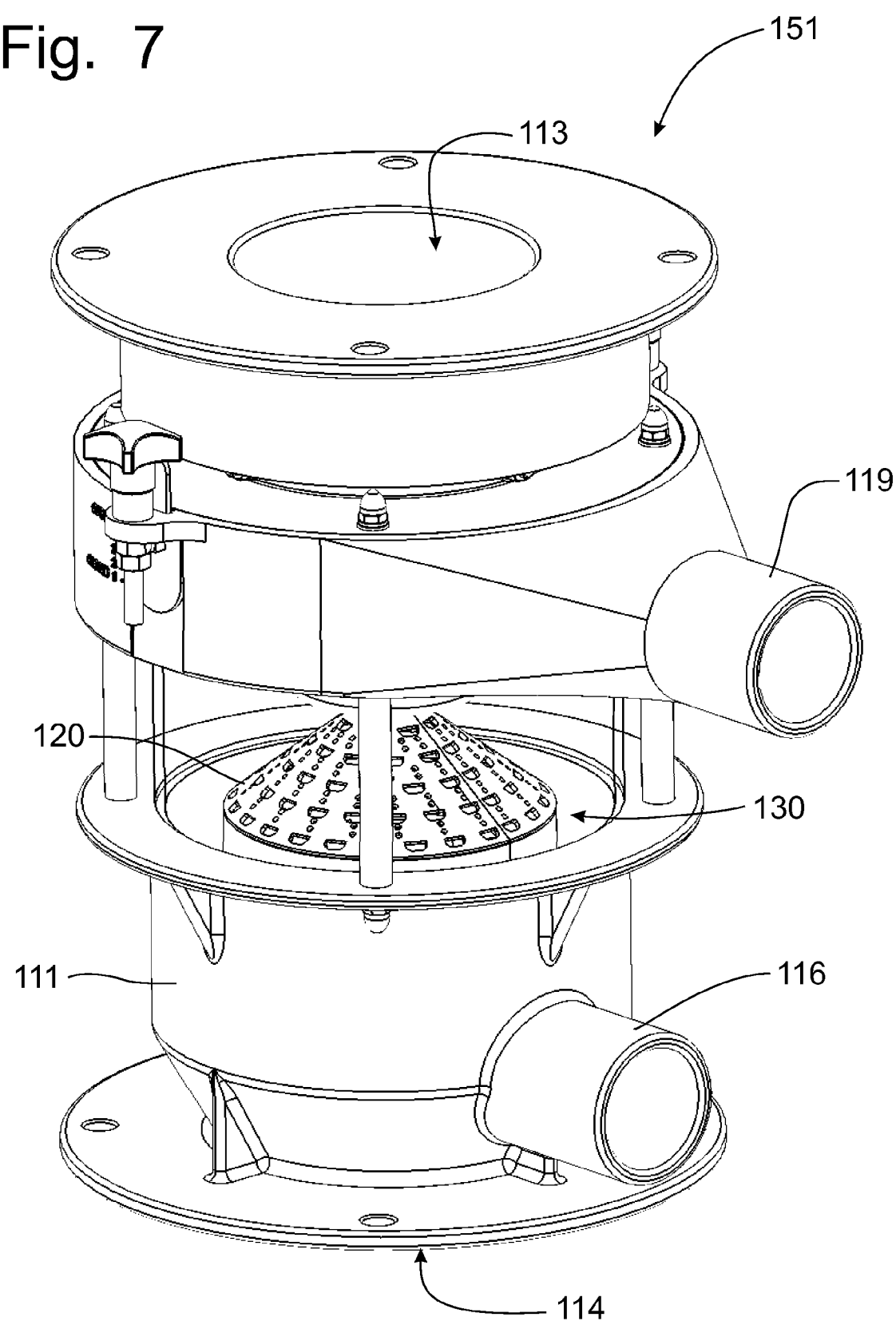
FIG. 7 is a perspective view of a cylindrical dedusting apparatus having a conical wash deck formed with apertures for the passage of a flow of air to remove dirt and debris from a flow of particulate material over the top surface of the conical wash deck.

Looking at the dedusting apparatus shown in FIGS. 5 and 7, two different configurations of a dedusting apparatus 51, 151 for utilization in the instant invention can best be seen. In the box-shaped dedusting apparatus 51 shown in FIG. 5, the wash deck 120 is a double planar configuration extending along a downward incline from the product inlet 113. The wash deck 120 is supported in a housing 111 that provides a clean air inlet 116 and a dirty air discharge 119 after the air has blown through apertures 121 and slots 122 formed in the wash deck 120, as is best seen in FIG. 6. The lower discharge end of the wash deck 120 is spaced from the housing to define a Venturi zone 130 through which the cleaned particulate material must pass to reach the product outlet 114.

Figure 8:
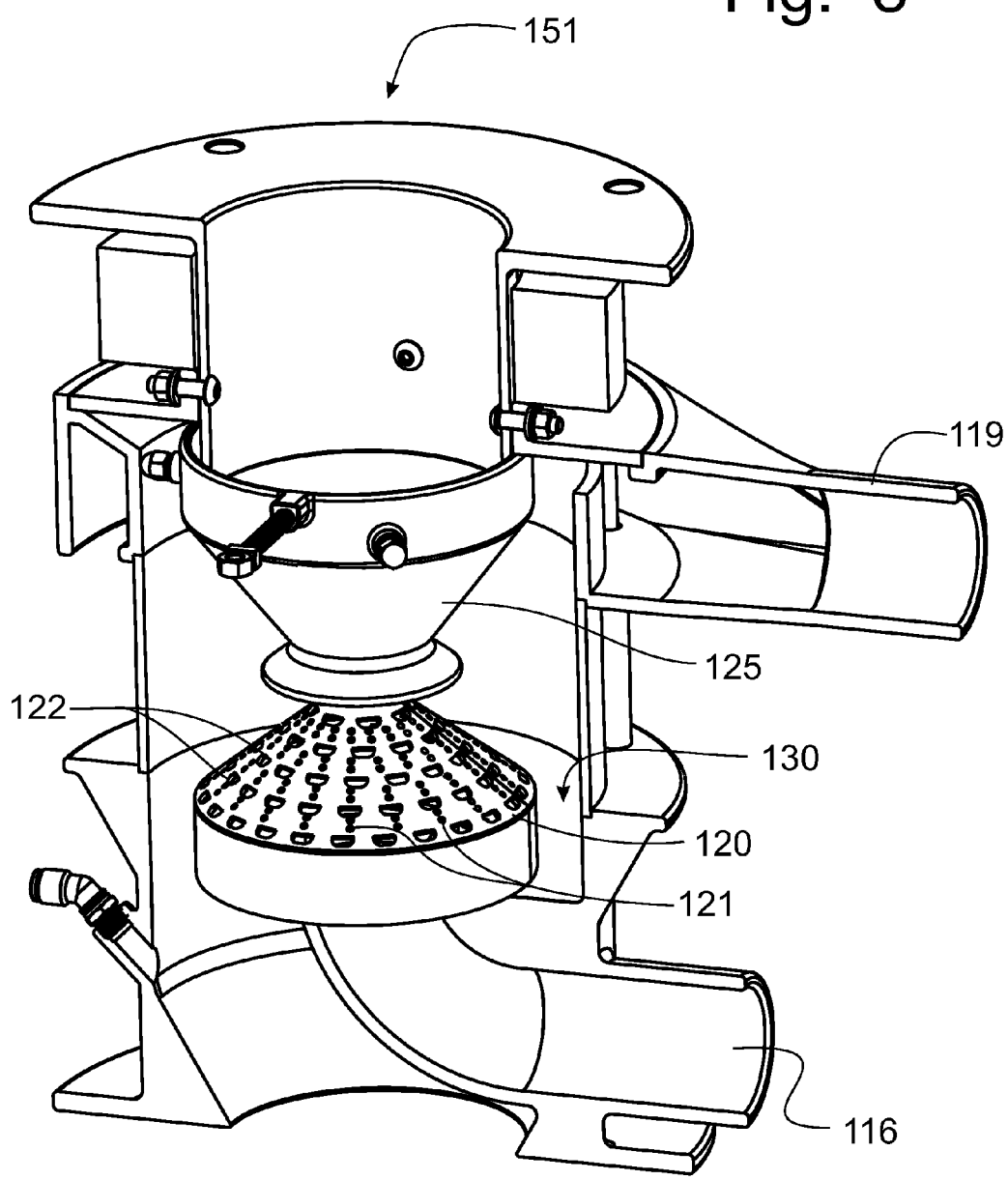
FIG. 8 is a partial vertical cross-sectional view to provide a better view of the conical wash deck and the infeed hopper delivering a flow of particulate material thereto.

Referring to FIGS. 7 and 8, an alternate configuration of the dedusting apparatus 151 can best be seen. The cylindrical dedusting apparatus 151 has a cylindrical housing 111 that supports a dirty product inlet 113 and a cleaned product outlet 114 along with a clean air inlet 116 and a dirty air outlet 119. The conical wash deck 120 is supported on the housing 111 such that clean air blows through the apertures 121 and slots 122 formed in the wash deck 120 for the passage of cleaning air through the particulate material flowing over the top surface of the wash deck 120 to separate the dirt and debris from the particulate material flowing over the top surface of the wash deck 120 from the product inlet 113. Similar to the box-shaped configuration of FIGS. 5 and 6, the lower discharge edge of the conical wash deck 120 is spaced from the housing 111 to form a Venturi zone 130 thorough which the particulate material must pass before reaching the product outlet 114.

Having thus described the invention, what is claimed is:

1. A pneumatic conveying system for transporting dirt and debris laden particulate materials from at least two supply sources to a place of discharge, comprising:

a primary conduit carrying a flow of compressed air from a source of compressed air;

at least two infeed conduits respectively carrying a flow of compressed air from said source of compressed air and being connected to said primary conduit by corresponding first diverter valves, each said first diverter valve being movable between on and off positions to selectively control the flow of dirt and debris laden particulate material from the corresponding said supply sources via the corresponding said infeed conduit into said primary conduit;

at least two rotary valves interconnecting corresponding said supply sources and the corresponding said infeed conduit to deliver dirt and debris laden particulate material from said supply sources into the corresponding infeed conduit;

a plurality of bulk storage devices connected to said primary conduit remotely from said first infeed conduit by corresponding second diverter valves to selectively direct a flow of particulate material from said primary conduit into a selected said bulk storage device, said bulk storage devices holding respective supplies of said dirt and debris laden particulate material for discharge to said place of discharge; and a closed loop particulate material cleaning apparatus connected to each said bulk storage device to clean dirt and debris from the dirt and debris laden particulate material discharged from each said bulk storage device to said place of discharge, each said closed loop particulate material cleaning apparatus including a dedusting apparatus having a wash deck arranged to receive said flow of dirt and debris laden particulate material over a top surface thereof, said wash deck having apertures therethrough for the passage of said flow of air through said wash deck and through said dirt and debris laden particulate material to remove dirt and debris therefrom through entrainment in said flow of air, each said closed loop particulate material cleaning apparatus defining a closed loop flow path for the flow of air through said dedusting apparatus, said closed loop flow path including a fan, a filter positioned upstream of said dedusting apparatus between said fan and said dedusting apparatus, and a debris collection device located downstream of said dedusting apparatus between said dedusting apparatus and said fan to clean dirt and debris from the flow of air, said closed loop flow path moving air from said fan through said filter, into said dedusting apparatus, carrying dirt and debris from said dedusting apparatus to said debris collection device, and then return to said fan for re-circulation through said dedusting apparatus.

2. The pneumatic conveying system of claim 1 wherein said primary conduit and said first infeed conduit are formed with at least one right-angle bend to change direction of the pneumatic flow therein, each said right-angle bend including an expanded elbow fitting.

3. The pneumatic conveying system of claim 1 wherein said at least two supply sources includes multiple product supply bins carrying respective supplies of dirt and debris laden particulate material.

4. The pneumatic conveying system of claim 1 wherein said place of discharge comprises one of a manufacturing facility and a transportation device.

5. The pneumatic system of claim 4 wherein said transportation device comprises one of a rail car, a truck and a collection bag.

\* \* \* \* \*